United States Patent
Shah et al.

(10) Patent No.: US 7,437,738 B2
(45) Date of Patent: Oct. 14, 2008

(54) METHOD, SYSTEM, AND PROGRAM FOR INTERFACING WITH A NETWORK ADAPTOR SUPPORTING A PLURALITY OF DEVICES

(75) Inventors: Rajesh Shah, Portland, OR (US); Anil S. Keshavamurthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 777 days.

(21) Appl. No.: 10/712,207

(22) Filed: Nov. 12, 2003

(65) Prior Publication Data

US 2005/0102682 A1    May 12, 2005

(51) Int. Cl.
*G06F 9/54* (2006.01)
*G06F 13/40* (2006.01)

(52) U.S. Cl. ...................... 719/321; 710/100
(58) Field of Classification Search ................. 719/321; 710/100
See application file for complete search history.

(56) References Cited

U.S. PATENT DOCUMENTS

| | | | |
|---|---|---|---|
| 5,655,148 A | | 8/1997 | Richman et al. |
| 5,987,554 A | | 11/1999 | Liu et al. |
| 6,003,097 A | * | 12/1999 | Richman et al. ............... 710/8 |
| 6,009,480 A | | 12/1999 | Pleso |
| 2002/0069245 A1 | * | 6/2002 | Kim ........................... 709/203 |
| 2003/0005207 A1 | * | 1/2003 | Langendorf et al. .......... 710/306 |
| 2003/0130833 A1 | * | 7/2003 | Brownell et al. ............... 703/23 |
| 2004/0003300 A1 | * | 1/2004 | Malueg et al. ............... 713/300 |
| 2004/0139240 A1 | * | 7/2004 | DiCorpo et al. ................ 710/3 |
| 2004/0148376 A1 | * | 7/2004 | Rangan et al. .............. 709/223 |

FOREIGN PATENT DOCUMENTS

EP    0506278    9/2002

OTHER PUBLICATIONS

PCT International Preliminary Report on Patentability (IPRP) and Written Opinion, May 26, 2006, for International Application No. PCT/US2004036757.
EP Amendment, May 3, 2007, for European Patent Application No. 04800728.0.

(Continued)

*Primary Examiner*—Meng-Ai An
*Assistant Examiner*—Abdou K Seye
(74) *Attorney, Agent, or Firm*—Konrad Raynes & Victor LLP; David W. Victor

(57) ABSTRACT

Provided are a method, system, and program for interfacing with device hardware supporting a plurality of devices. A device interface driver is initialized to represent the device hardware as a virtual bus to an operating system and to represent to the operating system each device supported in the device hardware as a device attached to the virtual bus. The device hardware is initialized and accessed to determine devices supported by the device hardware. One device object is generated for each determined device supported by the device hardware, wherein each generated device object represents the determined device to the operating system. The determined devices are reported to the operating system, wherein the operating system loads a device driver for each of the reported devices supported by the device hardware.

33 Claims, 7 Drawing Sheets

OTHER PUBLICATIONS

EP Office Action, Oct. 25, 2006, for European Patent Application No. 04800728.0.

Glogic, "iSCSI Terminology: TCP/IP", *Technology Brief*, Mar. 20, 2003, pp. 1-2.

Satran, J., K. Meth, C. Sapuntzakis, M. Chadalapaka, & E. Zeidner, "iSCSI", *Internet Draft*, Internet Engineering Task Force (IETF)- IP Storage Working Group, Jan. 19, 2003, pp. 1-238.

PCT/US2004/036757 Invitation to Pay Additional Fees, with partial prior art search; mailed Apr. 29, 2005.

Wolthusen, Stephen. "Goalkeeper: Close-In Interface Protection," Proc. 19th Computer Security Applications Conference (ACSAC 2003), 8 pp.

IBM Technical Disclosure Bulletin, "Horizontally Offset CRT for Direct Current-Coupled Resonant Flyback Deflection Circuits," vol. 38, No. 10, Oct. 1995; pp. 441-444.

IBM Technical Disclosure Bulletin, "Hardware Contention Serialization Algorithm," vol. 38, No. 4, Apr. 1995; pp. 73-77.

PCT/US2004/036757 International Search Report & Written Opinion mailed Jun. 30, 2005.

* cited by examiner

METHOD, SYSTEM, AND PROGRAM FOR INTERFACING WITH A NETWORK ADAPTOR SUPPORTING A PLURALITY OF DEVICES

BACKGROUND OF THE INVENTION

1. Field of the Invention

The present invention relates to a method, system, and program for interfacing with a network adaptor supporting a plurality of devices.

2. Description of the Related Art

In a network environment, a network adaptor on a host computer, such as an Ethernet card, Fibre Channel card, etc., will receive Input/Output (I/O) requests or responses to I/O requests initiated from the host. Often, the host computer operating system includes a device driver to communicate with the network adaptor hardware to manage I/O requests to transmit over a network. The device driver requires significant host processor resources to handle network transmission requests to the network adaptor. One technique to reduce the load on the host processor is the use of a Transmission Control Protocol (TCP)/Internet Protocol (IP) Offload Engine (TOE) in which the TCP/IP protocol related operations are supported by the network adaptor hardware as opposed to the device driver, thereby saving the host processor from having to perform the TCP/IP protocol related operations. The transport protocol operations include packaging data in a TCP/IP packet with a checksum and other information, and unpacking a TCP/IP packet received from over the network to access the payload or data.

A network adaptor may be capable of handling traffic for different transfer protocols. For each protocol the network adaptor supports, the host operating system may load a different software device driver to enable the operating system to interface with the network adaptor with respect to that protocol. Each device driver would then transfer packets to the network adaptor for further processing and transmission.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
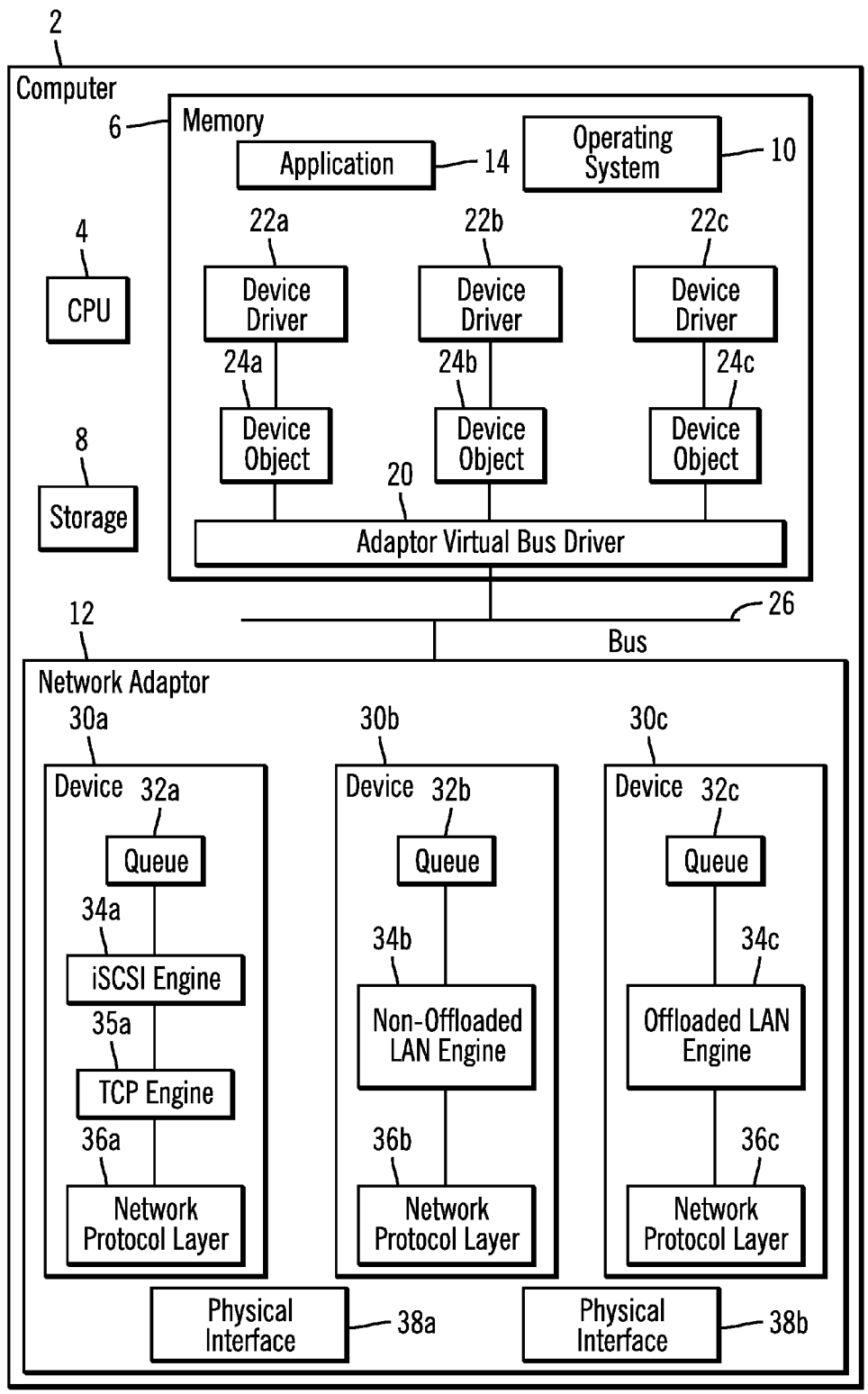
FIG. 1 illustrates a computing environment in which aspects of the invention are implemented.

FIG. 1 illustrates a computing environment in which aspects of the invention may be implemented. A computer 2 includes one or more central processing units (CPU) 4 (only one is shown), a volatile memory 6, non-volatile storage 8, an operating system 10, and a network adaptor 12 which communicates and receives data with respect to remote nodes over a network. An application program 14 further executes in memory 6 and is capable of transmitting and receiving packets from a remote computer. The computer 2 may comprise any computing device known in the art, such as a mainframe, server, personal computer, workstation, laptop, handheld computer, telephony device, network appliance, virtualization device, storage controller, etc. Various CPUs 4 and operating system 10 known in the art may be used. Programs and data in memory 6 may be swapped into storage 8 as part of memory management operations. The network to which the adaptor 12 connects may comprise networks known in the art, such as a Local Area Network (LAN), Wide Area Network (WAN), a Storage Area Network (SAN), the Internet, and Intranet, etc. Further, the adaptor 12 may provide for a network connection or point-to-point connection.

The operating system 10 may load an adaptor virtual bus driver 20 upon detecting the presence of the network adaptor 12, which may occur during initialization or dynamically, such as the case with plug-and-play device initialization. This virtual bus driver 20 comprises a device interface driver that represents the network adaptor 12 to the operating system. In certain embodiments, the adaptor virtual bus driver 20 would represent the network adaptor 12 as a virtual bus, such as a PCI bus, to the operating system 20 and report the presence on the virtual bus of multiple virtual adaptors, all supported by the network adaptor 12. Each of the reported virtual devices on the virtual bus would correspond to the different device protocols supported by the network adaptor 12, such as iSCSI, offloaded LAN driver, non-offloaded LAN driver, Fibre Channel, etc. For each device reported as attached to the virtual bus, represented by the adaptor virtual bus driver 20, the operating system 10 would load a protocol device driver 22*a*, 22*b*, 22*c*. Further, the adaptor virtual bus driver 20 would load a device object 24*a*, 24*b*, 24*c* to represent each device supported by the network adaptor 12. In the embodiment of FIG. 1, the operating system 10 loads three protocol device drivers 22*a*, 22*b*, 22*c*. However, the adaptor virtual bus driver 20 may report and the operating system 10, in response, may load any number of device drivers for the different transfer protocols supported by the network adaptor 12.

In certain embodiments, the adaptor virtual bus driver 20 would report the network adaptor 12, supporting multiple protocol devices and appearing to the operating system 12 as a virtual bus having multiple attached protocol devices, as a single bus function, e.g., PCI function, to the operating system 10. The device drivers 22*a*, 22*b*, 22*c* use the bus function, i.e., adaptor virtual bus driver 20, to access the resources, e.g., registers, of the network adaptor 12 hardware, so that the device driver controlling the bus function for the device assumes control over all the device hardware. Embodiments that provide a single bus function for the entire network adaptor 12 would prevent multiple device drivers from performing conflicting operations with respect to the network adaptor 12 hardware, e.g., writing to the same registers, etc. In this way, the adaptor virtual bus driver coordinates access by the device drivers 22*a*, 22*b*, 22*c* to all the devices 30*a*, 30*b*, 30*c* supported by the network adaptor 12.

The adaptor virtual bus driver 20 would further implement an interrupt service routine that is notified by the network adaptor 12 when work is completed or fails, such as when a packet is received or transmitted successfully. The adaptor virtual bus driver 20 communicates with the network adaptor 12 over a bus interface 26, which may implement a bus protocol known in the art, such as a Peripheral Component Interconnect (PCI) bus technology or a variant thereof, e.g., PCI Express, PCI-x, etc. In this way, the adaptor virtual bus driver 20 emulates a bus to the device drivers 22*a*, 22*b*, 22*c*, by generating the device objects 24*a*, 24*b*, 24*c* that emulate devices attached to a bus emulated by the adaptor virtual bus driver 20. In this way, to the operating system, the device drivers 22*a*, 22*b*, 22*c* interact with the adaptor virtual bus driver 20 as if the adaptor virtual bus driver 20 is a bus interface driver representing a bus having attached devices for the device objects 24*a*, 24*b*, 24*c* representing the devices 30*a*, 30*b*, 30*c*, which support different communication protocols.

FIG. 1 shows the network adaptor 12 supporting multiple devices 30*a*, 30*b*, 30*c*, where each device supports one communication protocol, e.g., Internet Small Computer System Interface ("iSCSI"), non-offloaded LAN driver, offloaded LAN driver, etc. The iSCSI protocol comprises an application layer that is layered over a TCP/IP stack to carry SCSI commands over TCP/IP and is typically used for storage networks. The term "iSCSI" as used herein refers to the syntax and semantic of the iSCSI protocol defined by the IETF (Internet Engineering Task Force) standards body, and any variant of that protocol. In current storage networks where iSCSI is utilized, the packet configuration comprises an Ethernet package encapsulating an Internet Protocol (IP) and Transmission Control Protocol (TCP) package layers, which further encapsulate an iSCSI package that includes one or more SCSI commands. The Ethernet protocol provides for link-level error checking as the packets flow from point-to-point on any network segment (link) to determine whether data has been corrupted while passing on a link. An iSCSI engine 34*a* supports the iSCSI related processing, such as unpackaging the iSCSI header to access the data therein, such as SCSI data, and a TCP engine 35*a* supports the TCP/IP protocol processing offloaded onto the adaptor 12.

Non-offloaded LAN, such as implemented in device 30*b*, refers to an embodiment where the TCP protocol layer processing is primarily supported in the device driver 22*b* in the host memory 6, with less TCP/IP support in a non-offloaded LAN engine 34*b* that provides TCP support on the adaptor 12. Offloaded LAN, such as implemented in device 30*c*, refers to an embodiment where the TCP layer processing is primarily supported in an offloaded LAN engine 34*c* on the network adaptor 12. Additional or different devices may be included that provide engines to support the processing of different communication protocols, e.g., Fibre Channel over IP, Remote Direct Memory Access (RDMA), Fibre Channel, etc., where such additional protocols may be layered on top of TCP or used in lieu of TCP. Further, for each supported communication protocol, one device in the network adaptor may support an offloaded version where the protocol is primarily supported in the network adaptor and another device in the network adaptor may support a non-offloaded version where the protocol is primarily supported in the host device driver.

For each supported device 30*a*, 30*b*, 30*c*, the network adaptor 12 may have a protocol queue 32*a*, 32*b*, 32*c* to queue packets received from the adaptor virtual bus driver 20, a protocol transport offload engine 34*a*, 34*b*, 34*c*, and a network protocol layer 36*a*, 36*b*, 36*c*. A network protocol layer 36*a*, 36*b*, 36*c* supports the network layer of the communication protocol, such as IP. The network layer 36*a*, 36*b*, 36*c* handles network communication and provides received packets to the transport protocol engine 32*a*, 32*b*, 32*c*. The network protocol layer 36*a*, 36*b*, 36*c* may perform such operations as switching and routing, creating logical paths, known as virtual circuits, for transmitting data from node to node, routing and forwarding, addressing, internetworking, error handling, congestion control and packet sequencing, and other network layer operations known in the art. Physical interfaces 38*a*, 38*b* provide the electrical hardware and components through which data is transferred, including electrical components, cables, etc. The physical interface may communicate data over copper wires, cables, such as Category 5 cables, a wireless transmitter and receiver, etc. The devices 30*a*, 30*b*, 30*c* may share the physical interfaces 38*a*, 38*b* or, alternatively, certain devices 30*a*, 30*b*, 30*c* may be assigned to use a specific physical interface 38*a*, 38*b*. Additional communication layers may also be supported, such as the data link layer defining the format of data on the network that handles the physical and logical connections to the packet's destination, such as the Ethernet protocol processing, the session layer, presentation layer, and application layer.

Further, FIG. 1 shows one protocol queue 30*a*, 30*b*, 30*c* for each device protocol to buffer the packets received for that device. However, in alternative embodiments, one queue may be used to buffer packets for different devices and transport offload engines 32*a*, 32*b*, 32*c*. Further, the network protocol layer 36*a*, 36*b*, 36*c* may comprise a single network protocol layer component used for all the different devices 30*a*, 30*b*, 30*c*, not separate network protocol layers as shown in FIG. 1.

Figure 2:
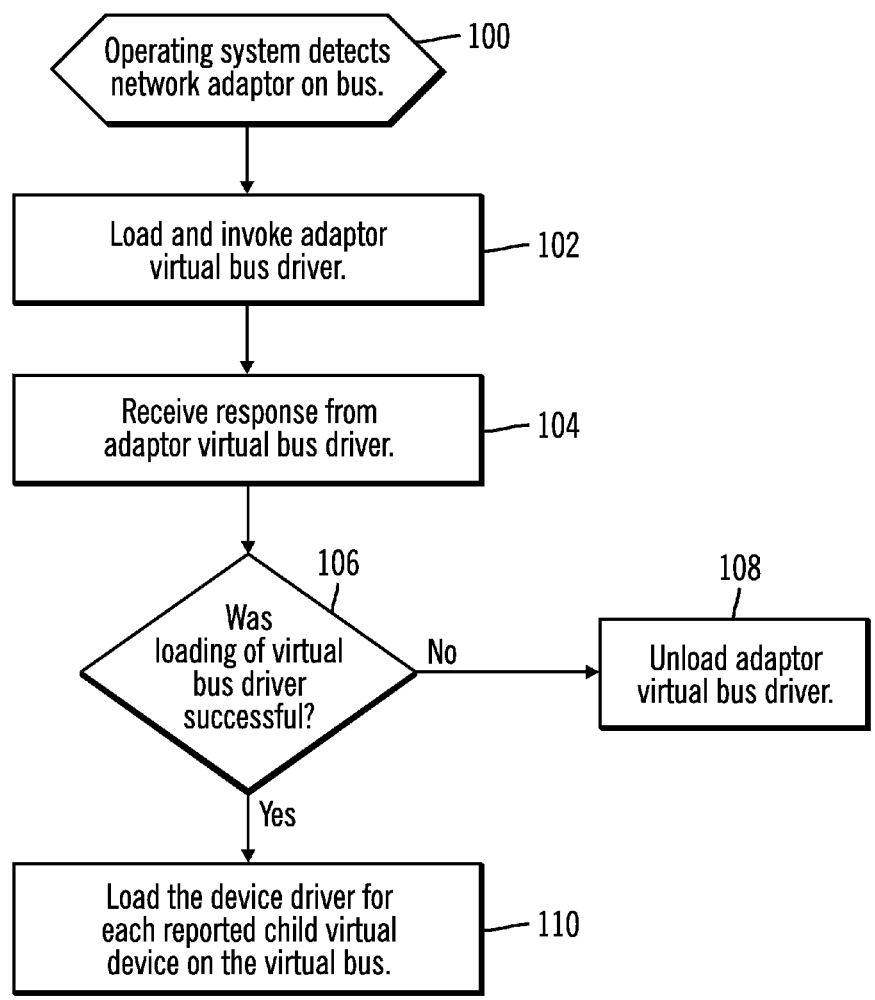
FIG. 2 illustrates operations performed by an operating system to communicate with a network adaptor in accordance with embodiments of the invention.

FIG. 2 illustrates operations the operating system 12 performs upon detecting (at block 100) the presence of the network adaptor 12 on the bus 26. The operating system 12 may detect the network adaptor 12 during initialization when walking the bus 26 to detect all devices or dynamically after initialization. Upon detecting the network adaptor 12, the operating system 12 loads (at block 102) and invokes the adaptor virtual bus driver 20.

Figure 3:
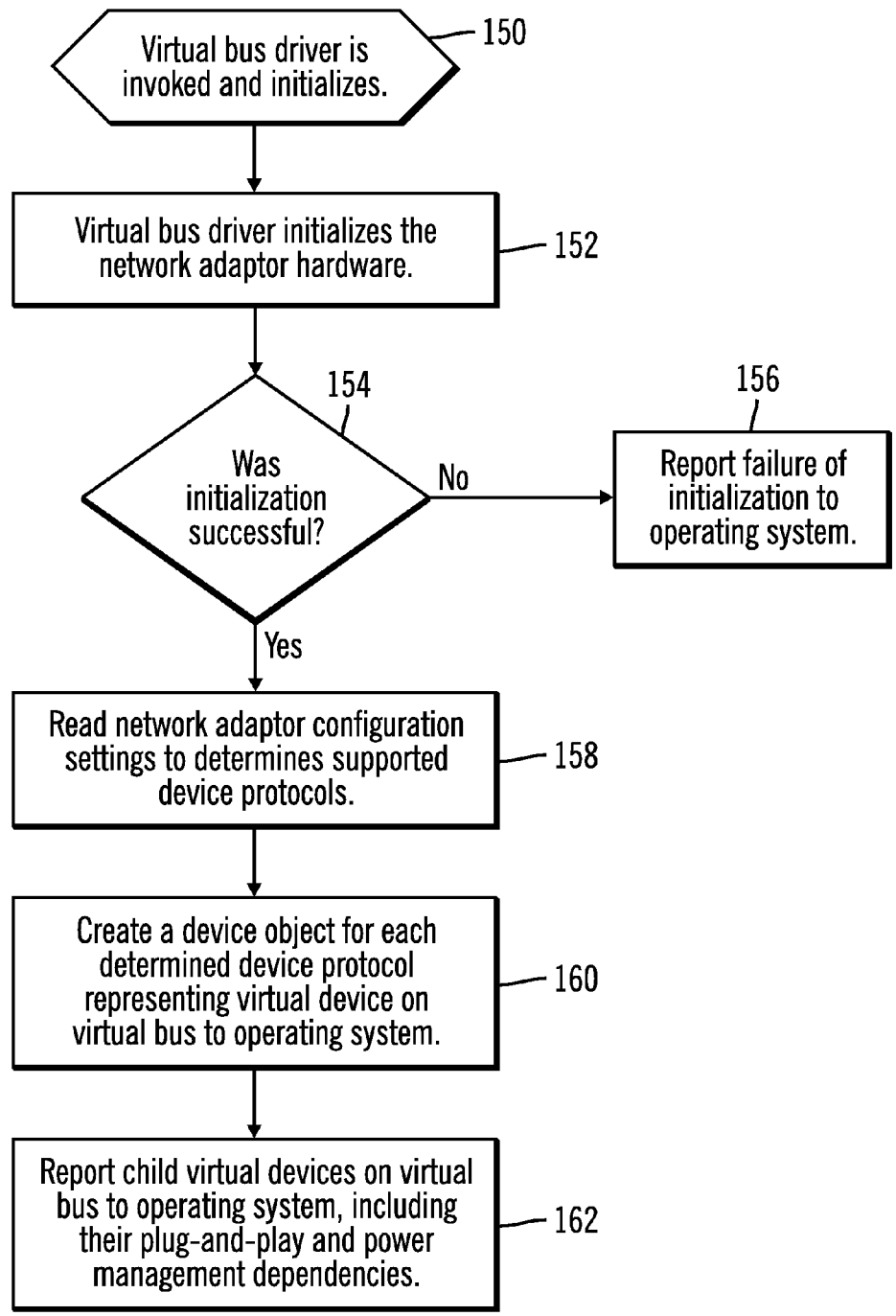
FIGS. 3, 4, 5, and 6 illustrate operations performed to interface between the operating system and network adaptor in accordance with embodiments of the invention.

Control then proceeds to FIG. 3 which represents operations the adaptor virtual bus driver 20 performs when invoked (at block 150) by the operating system 10. Upon being initially invoked (at block 150), the adaptor virtual bus driver 20 initializes (at block 152) the network adaptor 12 hardware by setting registers, etc. If (at block 154) the initialization was not successful, then the failure of initialization is reported (at block 156) to the operating system 10. Otherwise, if initialization succeeds, then the adaptor virtual bus driver 20 reads (at block 158) the network adaptor 12 hardware configuration settings to determine the devices 30*a*, 30*b*, 30*c* supported by the network adaptor 12. The protocols may be supported by the corresponding drivers 22, 22*b*, 22*c* and the hardware 30*a*, 30*b*, 30*c*. Upon determining the supported devices, the virtual bus driver 20 creates (at block 160) a device object 24*a*, 24*b*, 24*c* for each determined device 30*a*, 30*b*, 30*c* protocol supported in the network adaptor 12. The device object 24*a*, 24*b*, 24*c* would represent the determined devices 30*a*, 30*b*, 30*c* to the operating system 12 as virtual devices attached to a virtual bus, represented by the adaptor virtual bus driver 20. The virtual bus driver 20 would further report (at block 162) child virtual devices, represented by the device objects 24*a*, 24*b*, 24*c*, to the operating system 10 as attached to the virtual bus, including their plug-and-play and power management dependencies.

In certain plug-and-play embodiments, the adaptor virtual bus driver 20 may report the supported devices as dependent on the virtual bus, i.e., the device supported by the virtual bus driver 20. This reported dependency would prevent the operating system 10 from dynamically removing the adaptor virtual bus driver 20 before removing all the dependent child device drivers 22*a*, 22*b*, 22*c* that are loaded for all virtual devices supported by the network adaptor 12 that are reported as being dependent on the virtual bus driver 22. Further, the virtual bus driver 20 can report to the operating system 10 power management facility that the operating system 12 power manager cannot place the virtual bus, i.e., network adaptor 10, represented by the adaptor virtual bus driver 20 to a lower power state as long as any of the dependent device driver 22a, 22b, 22c stacks are in a fully functional state. This would require that the operating system 12 power manager place all the dependent device driver 22a, 22b, 22c stacks to the lower power state before attempting to place the device, i.e., the virtual bus, represented by the adaptor virtual bus driver 20 to the lower power state. Thus, the operating system 10 would have to perform state change operations that could affect the entire adaptor 12, such as dynamically removing a device driver or power change, to all the devices 30a, 30b, 30c supported by the network adaptor 12, which appear to the operating system as separate virtual devices behind a virtual bus. Additionally, the virtual adaptor bus driver 12 may dynamically load a device driver and device object for a newly detected device upon that device becoming available.

With respect to FIG. 2, upon the operating system 12 receiving (at block 104) a response from the adaptor virtual bus driver 20 after invoking the driver 20 for initialization, if (at block 106) the loading and initialization of the virtual bus driver 20 was not successful, then the adaptor virtual bus driver 20 is unloaded (at block 108); otherwise, the operating system 10 loads (at block 110) the device driver 22a, 22b, 22c for each reported device supported in the network adaptor 12, which the operating system 12 views as virtual devices represented by device objects 24a, 24b . . . 24cn on a virtual bus represented by the adaptor virtual bus driver 20.

Figure 4:
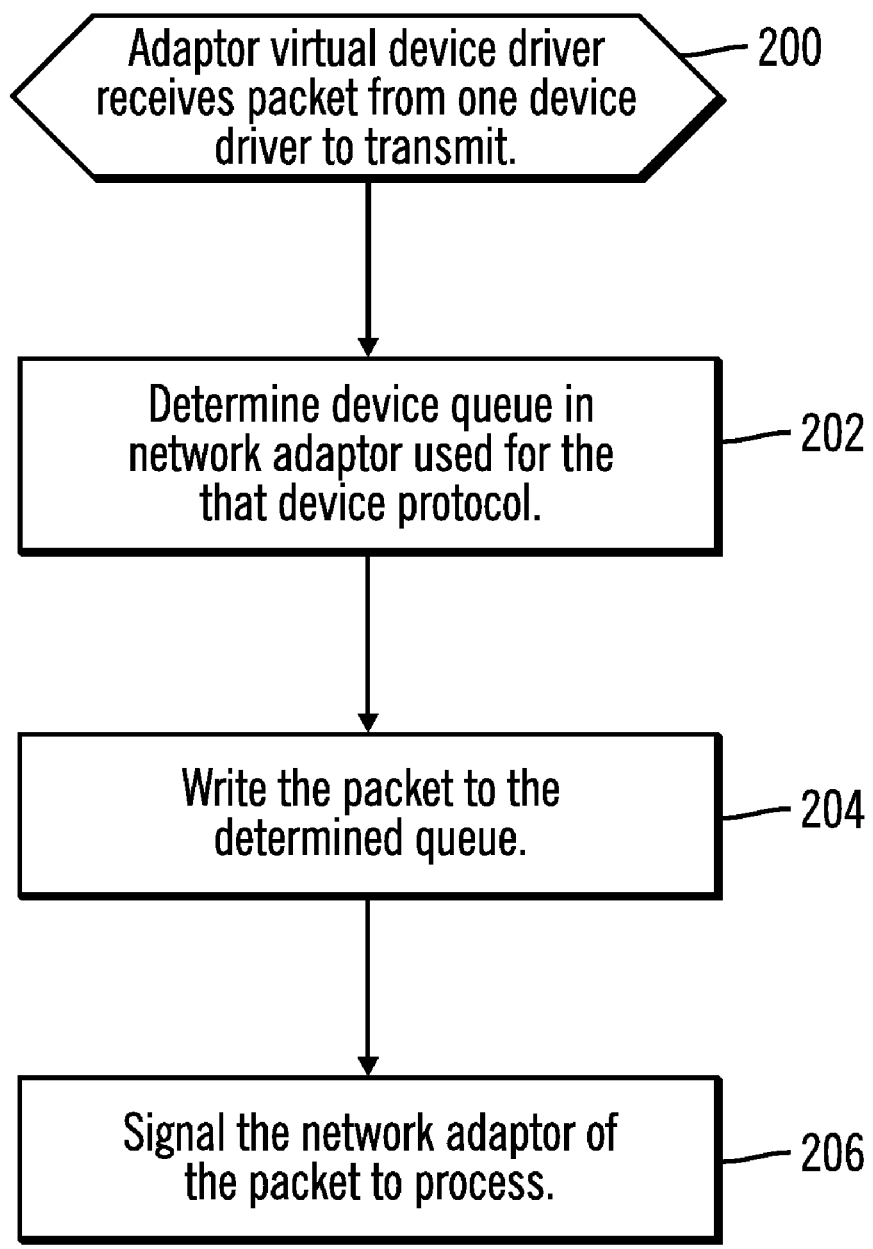

FIG. 4 illustrates operations performed by the adaptor virtual bus driver 20 upon receiving (at block 200) a packet from one of the device drivers 22a, 22b, 22c to send to one device 30a, 30b, 30c supported by the network adaptor 12. This packet may be addressed to the device object 24a, 24b, 24c representing the virtual device to which the packet is directed. The adaptor virtual bus driver 20 would determine (at block 202) the device queue 32a, 32b, 32c in the network adaptor 12 that queues packets for the device represented by the device object 24a, 24b, 24c. The adaptor virtual bus driver 20 then writes (at block 204) the received packet to the determined queue 32a, 32b, 32c and signals (at block 206) the network adaptor 12 of the packet to process. This would cause the transport offload engine 34a, 34b, 34c in the device 30a, 30b, 30c to which the packet is directed to process the packet in the queue 32a, 32b, 32c and forward the packet to the corresponding network protocol layer 36a, 36b, 36c to transmit over the network 18.

Figure 5:
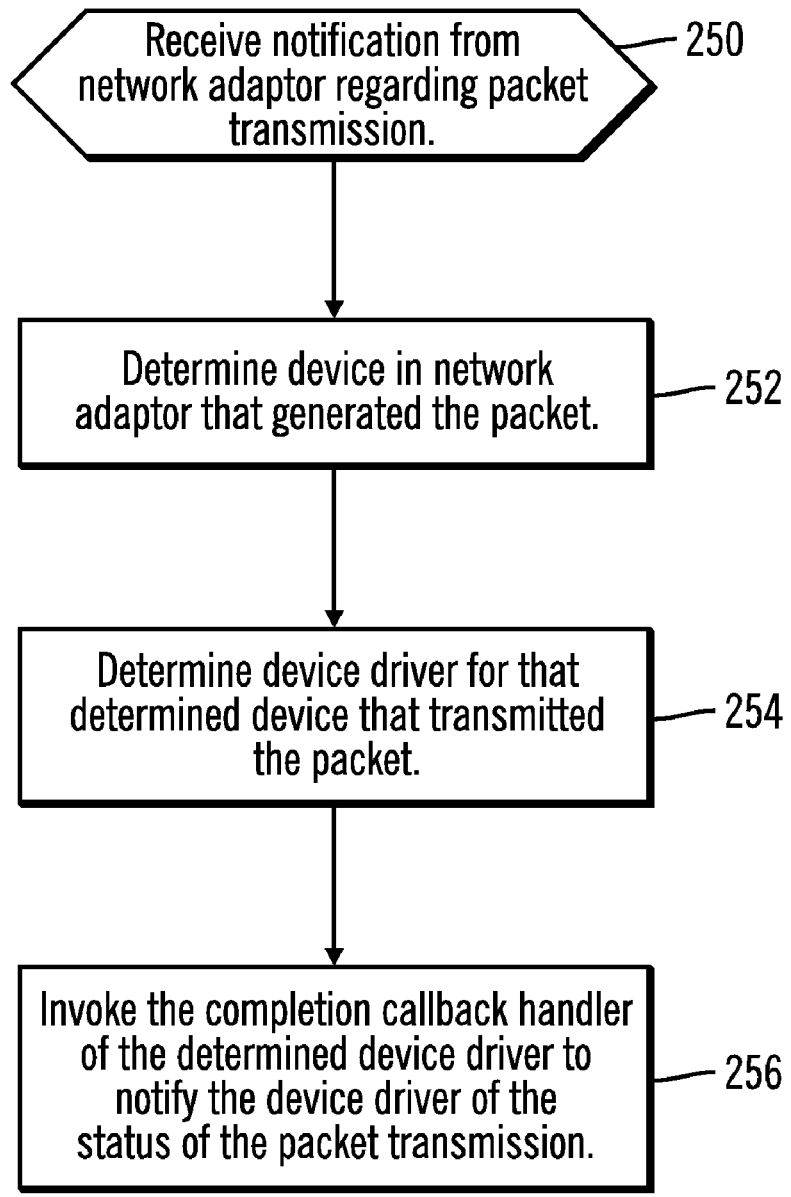

FIG. 5 illustrates operations performed by the adaptor virtual bus driver 20 upon receiving (at block 250) notification from the network adaptor 12 regarding a packet transmission, such as successful, failed, etc. The adaptor virtual bus driver 20 would determine (at block 252) the device 30a, 30b, 30c in the network adaptor 12 that generated the packet and determine (at block 254) the device driver 22a, 22b, 22c for that determined device that transmitted the packet. The completion callback handler of the determined device driver 22a, 22b, 22c is then called (at block 256) to notify the determined device driver of the status of the packet transmission.

Figure 6:
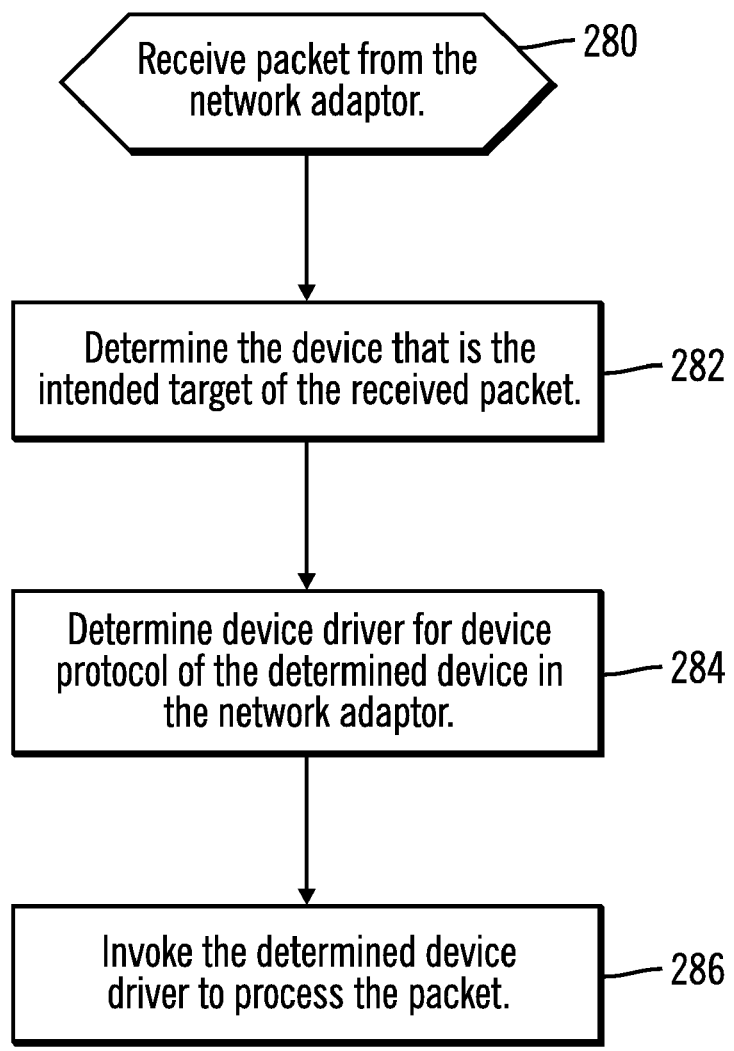

FIG. 6 illustrates operations performed by the adaptor virtual bus driver 20 upon receiving (at block 280) a packet from the network adaptor 12 to transmit to the operating system 12. In response, the adaptor virtual bus driver 20 determines (at block 282) the device 30a, 30b, 30c in the network adaptor 12, represented by device object 24a, 24b, 24c in the computer 2, that was the target of the received packet and determines (at block 284) the device driver 22a, 22b, 22c for the device sending the packet. The adaptor virtual bus driver 20 then invokes (at block 286) the determined device driver 22a, 22b, 22c to process the packet. For instance, the interrupt service routine implemented in the adaptor virtual bus driver 20 code may signal the determined device driver 22a, 22b, 22c, directly or through the operating system 12 (such as through an interrupt service routine handler), that a packet is available for processing in memory, where the network adaptor 12 may write packets directly to designated buffers in memory 6.

In additional embodiments, the network adaptor 12 may be configured such that each physical interface 38a, 38b is dedicated to a different device, such as one iSCSI port, one LAN port, etc. In such case, the adaptor virtual bus driver 20 would report to the operating system that the virtual bus, which represents the network adaptor 12, contains each device for which the network adaptor is configured, i.e., two iSCSI adaptors, one iSCSi adaptor one LAN adaptor, etc. The end user may program the network adaptor to associate different devices, i.e., protocols, with different ports. After such reconfiguration, the adaptor virtual bus driver 20 would report to the operating system 12 the new device configuration behind the virtual bus to cause the operating system 12 to then remove or load additional device drivers to support the virtual devices behind the virtual bus. Further, in certain embodiments, this reconfiguration may be performed dynamically without requiring a system reboot.

Additional Embodiment Details

The described embodiments for interfacing between an operating system and a device may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

In the described embodiments, certain operations were described as being performed by the device drivers 22a, 22b, 22c and protocol engines 34a, 35a, 35b, 35c. In alterative embodiments, operations described as performed by the device driver may be performed by the device transport offload engine, and vice versa.

In the described embodiments, the packets are received at a network adaptor card from a remote computer over a network. In alternative embodiments, the transmitted and received packets processed by the transport protocol layer or device driver may be received from a separate process executing in the same computer in which the device driver and transport protocol driver execute.

In certain implementations, the device driver and network adaptor embodiments may be included in a computer system including a storage controller, such as a SCSI, Integrated Drive Electronics (IDE), Redundant Array of Independent Disk (RAID), etc., controller, that manages access to a non-volatile storage device, such as a magnetic disk drive, tape media, optical disk, etc. In alternative implementations, the network adaptor embodiments may be included in a system that does not include a storage controller, such as certain hubs and switches.

In certain implementations, the network adaptor may be configured to transmit data across a cable connected to a port on the network adaptor. Alternatively, the network adaptor embodiments may be configured to transmit data over a wireless network or connection, such as wireless LAN, Bluetooth, etc.

The described virtual bus driver was used to interface the operating system with a network adaptor supporting a plurality of devices or protocols. In alternative embodiments, the virtual bus driver may be used to interface with devices other than network adaptors that themselves support different devices. For instance, the described virtual bus driver may be used to interface with a storage controller that supports separate storage device protocols.

In described embodiments, each protocol engine, e.g., 34a, 35a, 34b, 34c, is capable of processing packets using a communication protocol, such as iSCSI, offloaded LAN, non-offloaded LAN, and a packet transmission protocol, such as TCP/IP. In alternative embodiments, a different packet transmission protocol other than TCP/IP may be used to transmit the packets implementing the additional protocol.

In described embodiments, the communication protocols that run over the TCP/IP packet transmission protocol comprised iSCSI, offloaded LAN, non-offloaded LAN. In additional embodiments, other communication protocols may be involved, such as Fibre Channel, SCSI, etc.

The illustrated logic of FIGS. 2, 3, 4, 5, and 6 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Figure 7:
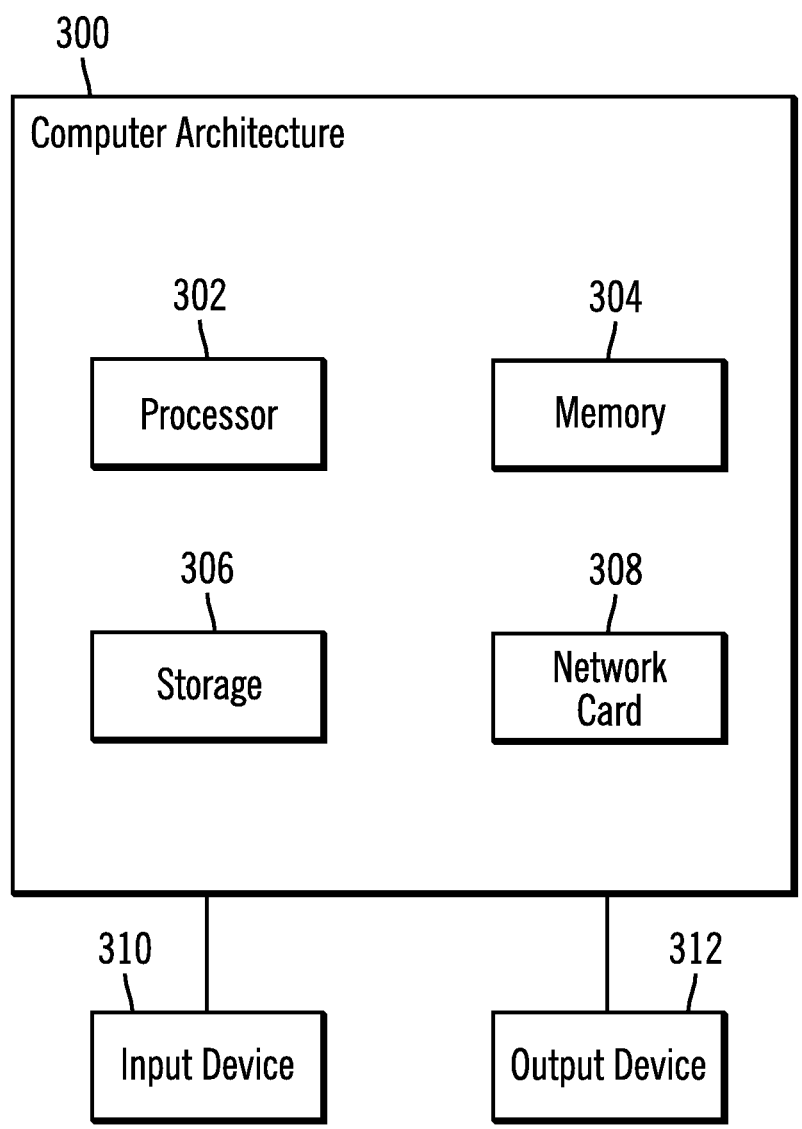
FIG. 7 illustrates an architecture that may be used with the described embodiments.

FIG. 7 illustrates one implementation of a computer architecture 300 of the computer in FIG. 1. The architecture 300 may include a processor 302 (e.g., a microprocessor), a memory 304 (e.g., a volatile memory device), and storage 306 (e.g., a non-volatile storage, such as magnetic disk drives, optical disk drives, a tape drive, etc.). The storage 306 may comprise an internal storage device or an attached or network accessible storage. Programs in the storage 306 are loaded into the memory 304 and executed by the processor 302 in a manner known in the art. The architecture further includes a network card 308 to enable communication with a network, such as an Ethernet, a Fibre Channel Arbitrated Loop, etc. Further, the architecture may, in certain embodiments, include a video controller 309 to render information on a display monitor, where the video controller 309 may be implemented on a video card or integrated on integrated circuit components mounted on the motherboard. As discussed, certain of the network devices may have multiple network cards. An input device 310 is used to provide user input to the processor 302, and may include a keyboard, mouse, pen-stylus, microphone, touch sensitive display screen, or any other activation or input mechanism known in the art. An output device 312 is capable of rendering information transmitted from the processor 302, or other component, such as a display monitor, printer, storage, etc.

The network adaptor 12 may be implemented on a network card, such as a Peripheral Component Interconnect (PCI) card or some other I/O card, or on integrated circuit components mounted on the motherboard.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for interfacing with device hardware supporting a plurality of devices included in the device hardware, comprising:

initializing a device interface driver to represent the device hardware as a virtual bus to an operating system and to represent to the operating system each device supported in the device hardware as a device attached to the virtual bus;

initializing the device hardware;

accessing the device hardware to determine the devices included in the device hardware;

generating one device object for each determined device in the device hardware, wherein each generated device object represents the determined device to the operating system; and reporting the determined devices to the operating system, wherein the operating system loads a device driver for each of the reported devices supported by the device hardware;

reporting to the operating system that the determined devices are dependent on the virtual bus, wherein in response to being notified that the determined devices and virtual bus are dependent, the operating system will not remove the device interface driver representing the virtual bus until the device drivers associated with the determined devices are removed; and reporting to the operating system that a power state of the virtual bus represented by the device interface driver cannot be altered until all the device drivers representing devices attached to the virtual bus have their power state similarly altered.

2. The method of claim 1, wherein the hardware device comprises a network adaptor and wherein each device available in the network adaptor supports a protocol engine for different communication protocols.

3. The method of claim 2, wherein each protocol engine processes packets according to a communication protocol and a network protocol, wherein each transport engine supports a different communication protocol and uses a same network protocol.

4. The method of claim 1, further comprising:
receiving a packet from one device driver;
determining a device queue in the device hardware queuing packets for the device supported by the device hardware corresponding to the device driver; and
writing the received packet to the determined queue.

5. The method of claim 1, further comprising:
receiving notification from the device hardware concerning transmission of one packet;
determining the device driver for the device in the network adaptor that processed the packet; and
transmitting notification to the determined device driver indicating the notification received from the device hardware.

6. The method of claim 1, further comprising:
receiving indication of a packet provided by the device hardware;
determining the device driver for the device supported by the network adaptor that processed the provided packet;
invoking a call to cause the determined device driver to process the provided packet.

7. The method of claim 1, wherein all the device drivers access devices supported by the device hardware through the device interface driver.

8. The method of claim 1, wherein the devices determined in the device hardware for which device objects are generated comprise less than all the devices included in the device hardware.

9. The method of claim 1, further comprising:
in response to detecting a change in the configuration of devices supported by the device hardware, signaling the operating system of the changed configuration of devices available in the device hardware, wherein the operating system is capable of loading or unloading device drivers to support the changed configuration of devices available in the device hardware.

10. The method of claim 1, wherein the operations of initializing the device hardware, accessing the device hardware to determine devices supported by the device hardware, generating the device objects, and reporting the determined devices to the operating system are performed by the device interface driver.

11. The method of claim 1, wherein one device includes a protocol engine supporting the Internet Small Computer Interface (iSCSI) communication protocol and Transmission Control Protocol (TCP) communication protocol, wherein one device includes a protocol engine supporting an offloaded Local Area Network (LAN) communication protocol, and wherein one device includes a protocol engine supporting non-offloaded-LAN protocol.

12. A system, comprising:
a processor;
an operating system executed by the processor,
a network adaptor supporting a plurality of devices included in the network adaptor;
a device interface driver that represents the network adaptor as a virtual bus to the operating system, and that represents to the operating system each device supported in the device hardware as a device attached to the virtual bus, wherein the processor, when executing the device interface driver, is enabled to:
access the network adaptor to determine the devices included in by the network adaptor;
generate one device object for each determined device in the network adaptor, wherein each generated device object represents the determined device to the operating system; and
report the determined devices to the operating system, wherein the operating system loads a device driver for each of the reported devices supported by the network adaptor, and wherein to the operating system each determined device is considered attached to the virtual bus;
report to the operating system that the determined devices are dependent on the virtual bus, wherein in response to being notified that the determined devices and virtual bus are dependent, the operating system will not remove the device interface driver representing the virtual bus until the device drivers associated with the determined devices are removed; and
report to the overrating system that a power state of the virtual bus represented by the device interface driver cannot be altered until all the device drivers represented devices attached to the virtual bus have their power state similarly altered.

13. The system of claim 12, wherein each device available in the network adaptor supports a protocol engine for different communication protocols.

14. The system of claim 13, wherein each protocol engine processes packets according to a communication protocol, wherein each protocol engine supports a different communication protocol and uses a same network protocol.

15. The system of claim 12, wherein the processor, when executing the device interface driver, is further enabled to:
receive a packet from one device driver;
determine a device queue in the network adaptor queuing packets for the device supported by the hardware device corresponding to the device driver; and
write the received packet to the determined queue.

16. The system of claim 12, wherein the processor, when executing the device interface driver, is further enabled to:
receive notification from the network adaptor concerning transmission of one packet;
determine the device driver for the device in the network adaptor that processed the packet; and
transmit notification to the determined device driver indicating the notification received from the device hardware.

17. The system of claim 12, wherein the processor, when executing the device interface driver, is further enabled to:
receive indication of a packet provided by the network adaptor;
determine the device driver for the device supported by the network adaptor that processed the provided packet;
invoke a call to cause the determined device driver to process the provided packet.

18. The system of claim 12, wherein all the device drivers access devices supported by the network adaptor through the device interface driver.

19. The system of claim 12, wherein the devices determined in the network adaptor for which device objects are generated comprise less than all the devices included in the network adaptor.

20. The system of claim 12, wherein the processor, when executing the device interface driver, is further enabled to:
signal the operating system of the changed configuration of devices available in the device hardware in response to detecting a change in the configuration of devices supported by the device hardware, wherein the operating system is capable of loading or unloading device drivers to support the changed configuration of devices available in the device hardware.

21. The system of claim 12, wherein one device includes a protocol engine supporting the Internet Small Computer Interface (iSCSI) communication protocol and Transmission Control Protocol (TCP) communication protocol, wherein one device includes a protocol engine supporting an offloaded Local Area Network (LAN) communication protocol, and wherein one device includes a protocol engine supporting non-offloaded-LAN protocol.

22. A system in communication with a network, comprising:
   a processor;
   an operating system executed by the processor,
   a network adaptor supporting a plurality of devices included in the network adaptor;
   at least one physical interface included in the network adaptor enabling communication of packets between the devices and the network, wherein the at least one physical interface is capable of interfacing with copper wires;
   a device interface driver that represents the network adaptor as a virtual bus to the operating system, and that represents to the operating system each device supported in the device hardware as a device attached to the virtual bus, wherein the processor, when executing the device interface driver, is enabled to:
      access the network adaptor to determine the devices included in the network adaptor;
      generate one device object for each determined device in the network adaptor, wherein each generated device object represents the determined device to the operating system; and
      report the determined devices to the operating system, wherein the operating system loads a device driver for each of the reported devices supported by the network adaptor, and wherein to the operating system each determined device is considered attached to the virtual bus;
      report to the operating system that the determined devices are dependent on the virtual bus, wherein in response to being notified that the determined devices and virtual bus are dependent, the operating system will not remove the device interface driver representing the virtual bus until the device drivers associated with the determined devices are removed; and
      report to the operating system that a power state of the virtual bus represented by the device interface driver cannot be altered until all the device drivers representing devices attached to the virtual bus have their power state similarly altered.

23. An article of manufacture comprising a computer readable storage medium including computer executable code for interfacing with device hardware supporting a plurality of devices included in the device hardware, wherein the code causes operations to be performed, the operations comprising:
   initializing a device interface driver to represent the device hardware as a virtual bus to an operating system and to represent to the operating system each device supported in the device hardware as a device attached to the virtual bus;
   initializing the device hardware;
   accessing the device hardware to determine the devices included in the device hardware;
   generating one device object for each determined device in the device hardware, wherein each generated device object represents the determined device to the operating system; and
   reporting the determined devices to the operating system, wherein the operating system loads a device driver for each of the reported devices supported by the device hardware;
   reporting to the operating system that the determined devices are dependent on the virtual bus, wherein in response to being notified that the determined devices and virtual bus are dependent, the operating system will not remove the device interface driver representing the virtual bus until the device drivers associated with the determined devices are removed; and
   reporting to the operating system that a power state of the virtual bus represented by the device interface driver cannot be altered until all the device drivers representing devices attached to the virtual bus have their power state similarly altered.

24. The article of manufacture of claim 23, wherein the hardware device comprises a network adaptor and wherein each device available in the network adaptor supports a protocol engine for different communication protocols.

25. The article of manufacture of claim 24, wherein each protocol engine processes packets according to a communication protocol and a network protocol, wherein each transport engine supports a different communication protocol and uses a same network protocol.

26. The article of manufacture of claim 23, wherein the operations further comprise:
   receiving a packet from one device driver;
   determining a device queue in the device hardware queuing packets for the device supported by the device hardware corresponding to the device driver; and
   writing the received packet to the determined queue.

27. The article of manufacture of claim 23, wherein the operations further comprise:
   receiving notification from the device hardware concerning transmission of one packet;
   determining the device driver for the device in the network adaptor that processed the packet; and
   transmitting notification to the determined device driver indicating the notification received from the device hardware.

28. The article of manufacture of claim 23, wherein the operations further comprise:
   receiving indication of a packet provided by the device hardware;
   determining the device driver for the device supported by the network adaptor that processed the provided packet;
   invoking a call to cause the determined device driver to process the provided packet.

29. The article of manufacture of claim 23, wherein all the device drivers access devices supported by the device hardware through the device interface driver.

30. The article of manufacture of claim 23, wherein the devices determined in the device hardware for which device objects are generated comprise less than all the devices included in the device hardware.

31. The article of manufacture of claim 23, wherein the operations further comprise:
   in response to detecting a change in the configuration of devices supported by the device hardware, signaling the operating system of the changed configuration of devices available in the device hardware, wherein the operating system is capable of loading or unloading device drivers to support the changed configuration of devices available in the device hardware.

32. The article of manufacture of claim 23, wherein the operations of initializing the device hardware, accessing the device hardware to determine devices supported by the device hardware, generating the device objects, and reporting the determined devices to the operating system are performed by the device interface driver.

33. The article of manufacture of claim 23, wherein one device includes a protocol engine supporting the Internet Small Computer Interface (iSCSI) communication protocol and Transmission Control Protocol (TCP) communication protocol, wherein one device includes a protocol engine supporting an offloaded Local Area Network (LAN) communication protocol, and wherein one device includes a protocol engine supporting non-offloaded-LAN protocol.

* * * * *

UNITED STATES PATENT AND TRADEMARK OFFICE
CERTIFICATE OF CORRECTION

PATENT NO. : 7,437,738 B2 Page 1 of 1
APPLICATION NO. : 10/712207
DATED : October 14, 2008
INVENTOR(S) : R. Shah and A. S. Keshavamurthy It is certified that error appears in the above-identified patent and that said Letters Patent is hereby corrected as shown below:

Column 9, Line 53, replace "," after processor with --;--.

Column 9, Line 67, cancel the word "and".

Column 10, Line 14, replace "overrating" with --operating--.

Column 10, Line 16 to 17, replace "represented" with --representing--.

Signed and Sealed this

Ninth Day of June, 2009

JOHN DOLL
*Acting Director of the United States Patent and Trademark Office*